United States Patent [19]

Osato et al.

[11] Patent Number: 4,664,977
[45] Date of Patent: May 12, 1987

[54] OPTO-MAGNETIC RECORDING MEDIUM

[75] Inventors: Yoichi Osato; Eiichi Fujii, both of Yokohama; Ichiro Saito, Kawasaki; Kozo Arao, Yokohama, all of Japan

[73] Assignee: Canon Kabushiki Kaisha, Tokyo, Japan

[21] Appl. No.: 717,650

[22] Filed: Mar. 29, 1985

[30] Foreign Application Priority Data

Apr. 2, 1984 [JP] Japan .................................. 59-63263

[51] Int. Cl.⁴ ............................................. G11B 7/24
[52] U.S. Cl. .................................... 428/336; 428/469; 428/472; 428/694; 428/900
[58] Field of Search ............... 428/692, 336, 694, 900, 428/469, 472; 365/122; 360/131, 135

[56] References Cited

FOREIGN PATENT DOCUMENTS 6541 1/1983 Japan .
6542 1/1983 Japan .

OTHER PUBLICATIONS

Monsuripur et al, J. Appl. Physics, 53(6), Jun. 1982, p. 4485, "Signal and Noise in Magneto-Optic Readout".

*Primary Examiner*—George F. Lesmes
*Assistant Examiner*—William M. Atkinson
*Attorney, Agent, or Firm*—Fitzpatrick, Cella, Harper & Scinto

[57] ABSTRACT

An opto-magnetic recording medium comprises a recording layer formed of a magnetic film having a readily magnetizable axis in a direction perpendicular to the surface of the film, and a reflective and phase modulating layer provided in contact with the recording layer. The reflective and phase modulating layer is formed so that the imaginary number portion (k) of the refractive index gradually increases in the direction of thickness away from that side which is in contact with the recording layer.

12 Claims, 4 Drawing Figures

DIRECTION TRANSVERSE TO LAYER

OPTO-MAGNETIC RECORDING MEDIUM

BACKGROUND OF THE INVENTION

1. Field of the Invention

The present invention relates to an opto-magnetic recording medium used for an opto-magnetic memory, a magnetic recording device or a display device and from which information is read-out by utilizing a magneto-optical effect such as magnetic Kerr effect or Faraday effect.

2. Description of the Prior Art

There have been developments relating to optical memories in which information recorded on various recording media is optically read, and such memories are attracting much attention for high-density large-capacity information storage as a result of recent progress in the laser and optical elements. Among such recording mediums there is the so called opto-magnetic recording medium in which magnetically recorded information is read by utilizing a magneto-optical effect. Such magneto-optical recording medium is provided, as a recording layer, with a magnetic layer that is easily magnetized in a direction perpendicular to the layer surface. Information recording is, for example, achieved by magnetizing said recording layer in one direction and partially heating said layer with a laser beam spot to invert the direction of magnetization in said heated spot. The information can be read optically from such information bearing medium by means of the magnetic Kerr effect or Faraday effect. Also the recorded information can be erased by partial or total heating of the medium in an externally applied magnetic field. The magnetic recording layer was originally composed of a polycrystalline thin layer such as MnBi, but recently investigated are amorphous alloy thin layers of transition metals (Fe, Co, Ni, etc.) and rare earth metals (Tb, Dy, Gd, Ho, etc.) represented by a ternary alloy GdTbFe, in order to achieve magnetically uniform film formation, a suitable information recording temperature and a large magneto-optical effect.

On the other hand, such opto-magnetic recording media are associated with a drawback of a low level of the reproduced signal. Particularly in signal reproduction through the Kerr Effect, it has been difficult to increase the signal-to-noise (S/N) ratio because of a small Kerr rotation angle. For this reason, there have been made various proposals for increasing said Kerr rotation angle through the improvement of the magnetic material constituting the recording layer, or formation of a dielectric layer of SiO or $SiO_2$ on the recording medium to utilize the multiple reflection on the recording layer.

Also, as disclosed in the Japanese Laid-open Patent Applications Nos. 6541/1983 and 6542/1983, it is proposed to utilize a sufficiently thin magnetic recording layer with a reflective metal layer on the back side, thereby obtaining a large reproduced signal through the combination of Kerr effect and Faraday effect. FIG. 1 of the accompanying drawings shows an example of such recording medium, comprising a translucent substrate 11, a magnetic recording layer 12, a reflective metal layer 13 and a protective layer 14. It is also reported (J. Appl. Phys., Vol. 53, No. 6, p. 4485–4494) that an even higher S/N ratio can be obtained, in a recording medium having a transparent dielectric layer between the magnetic recording layer and the reflective metal layer as shown in FIG. 2 of the accompanying drawings by the suitable selection of materials and thicknesses of said three layers. In FIG. 2 there are shown a translucent substrate 21, a magnetic recording layer 22, a transparent dielectric layer 23, a reflective metal layer 24 and a protective layer 25. Said transparent dielectric layer 23 functions to generate a phase difference between the light reflected at the interface between the amorphous magnetic layer 22 and the translucent opto-magnetic substrate 21, and the light reflected by the reflective metal layer 24 and reaching said interface, thereby reducing the reflectivity of the media and apparently increasing the angle of rotation of the plane of polarization by the magnetooptical effect.

However, such conventional opto-magnetic recording media have been easily oxidized, since the reflective layer is composed of a thin metal layer of a thickness of 100–600 Å. The oxidation of the reflective layer leads to lowered recording sensitivity and an increase in errors and signal deterioration in the signal readout, and eventually gives rise to the potential for oxidation of the recording layer. Also it is difficult to achieve a high S/N ratio by means of the above-explained transparent dielectric layer, since a uniform layer thickness cannot be reproduced precisely.

On the other hand, an opto-magnetic recording medium which eliminates the above-noted disadvantages by forming the reflective layer of a mixture of a substance having small absorption for a light of a predetermined wavelength and a substance having great reflection for such light has been proposed by the inventors.

SUMMARY OF THE INVENTION

It is an object of the present invention to provide an opto-magnetic recording medium from which reproduced signals of high S/N ratio can be obtained and which is excellent in preservation stability.

It is another object of the present invention to provide an opto-magnetic recording medium from which reproduced signals of high S/N ratio can be obtained and which can be easily made.

The above objects of the present invention are achieved by constructing the opto-magnetic recording medium by a recording layer formed of a magnetic film having a readly magnetizable axis in a direction perpendicular to the surface of the film, and a reflective and phase modulating layer provided in contact with the recording layer and formed so that the imaginary number portion (k) of the refractive index gradually increases in the direction of thickness away from that side which is in contact with the recording layer.

DESCRIPTION OF THE PREFERRED EMBODIMENT

Figure 1:
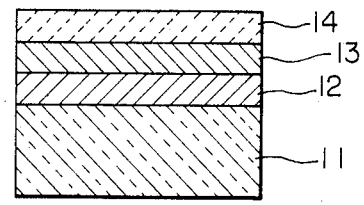
FIG. 1 is a schematic cross-sectional view showing an example of the construction of an optomagnetic recording medium according to the prior art.
Figure 2:
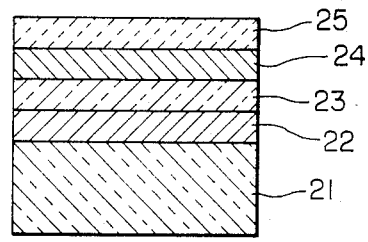
FIG. 2 is a schematic cross-sectional view showing another example of the construction of an opto-magnetic recording medium according to the prior art.
Figure 3:
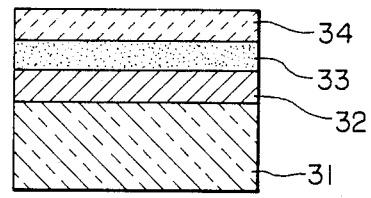
FIG. 3 is a schematic cross-sectional view showing the construction of an embodiment of the opto-magnetic recording medium of the present invention.

FIG. 3 shows the construction of an embodiment of the opto-magnetic recording medium of the present invention. In FIG. 3, reference numeral 31 designates a light-transmitting substrate, reference numeral 32 denotes a magnetic recording layer, reference numeral 33 designates a reflective and phase modulating layer, and reference numeral 34 denotes a protective layer. The light-transmitting substrate 31 is formed, for example, of glass or plastics. The magnetic recording layer 32 is formed of a magnetic film having a readily magnetizable axis in a direction perpendicular to the surface of the film. As such a magnetic film, use may preferably be made of a rare earth-transition metal amorphous alloy such as GdTbFe, TbDyFe, GdDyFe or GdTbFeCo having a great Kerr rotation angle. Information magnetically accumulated in the magnetic recording layer 32 is read out by the use of the magneto-optical effect by applying a reproducing light thereto through the light-transmitting substrate 31. That is, the reproducing light becomes a modulating light whose plane of polarization has been rotated in accordance with said information, and the rotation of such plane of polarization is converted into a variation in quantity of light by an analyzer or the like and detected to thereby reproduce the information.

The reflective and phase modulating layer 33 is formed so that the imaginary number portion k of the refractive index gradually increases in the direction of thickness away from that side which is in contact with the recording layer. The relation between the film thickness and the imaginary number portion k of the refractive index is schematically shown in FIG. 4 to explain the optical property of the reflective and phase modulating layer 33.

Figure 4:
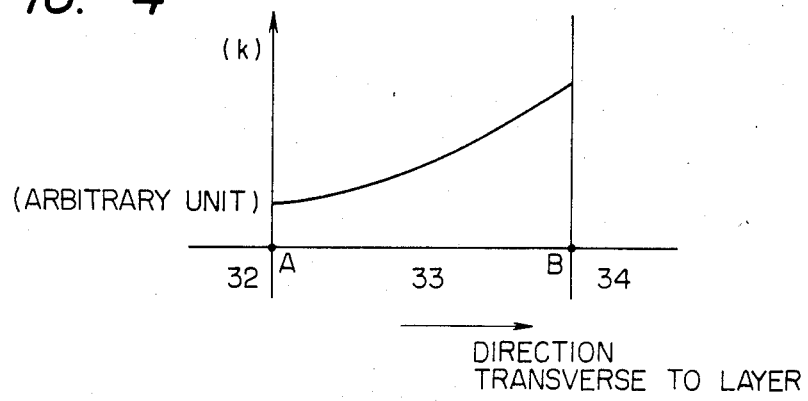
FIG. 4 is a schematic graph showing the distribution in the direction of film thickness of the imaginary number portion (k) of the refractive index in the reflective and phase modulating layer of the optomagnetic recording medium of the present invention.

In FIG. 4, point A represents the interface with the recording layer 32, point B represents the interface with the protective layer 34, the ordinate represents the imaginary number portion k of the refractive index in optional unit, and the abscissa represents the position of the reflective and phase modulating layer 33 in the direction of thickness. The imaginary number portion of the refractive index becomes greater from the point A toward the point B, namely, away from the interface with the recording layer 32. This layer 33 can be realized as by dispersing a substance of great reflection for the wavelength of said reproducing light in a substance of small absorption for the wavelength of said reproducing light, and forming the layer so that the content of the substance of great reflection gradually increases from that surface of the layer 33 which is adjacent to the recording layer toward the opposite surface. By such a construction, the reflective and phase modulating layer 33 performs the reflecting function and the phase modulating function at a time. That is, the reproducing light transmitted through the magnetic recording layer 32 and subjected to Faraday rotation is reflected by the reflective and phase modulating layer 33, is again transmitted through the magnetic recording layer while being again subjected to Faraday rotation and is detected as a signal of high S/N ratio by the increase in the rotational angle of the plane of polarization. Also, the reflective and phase modulating layer 33, unlike a metal film which reflects a linearly polarized light by a linearly polarized light, is formed of the mixture as previously described and therefore reflects the reproducing light entering as a linearly polarized light by an elliptically polarized light and thus, by effecting optimum alignment with the analyzer by the utilization of a phase plate, it is possible to obtain a higher S/N ratio. Also, the present invention endows the distribution of the imaginary number portion k of the refractive index with a gradient, whereby the depth at which the reproducing light is reflected is averaged and the irregularity of the reproduction characteristic between media is decreased. Further, the present invention has an advantage that the layers are hard to peel off with respect to each other.

As the substance of small absorption forming the reflective and phase modulating layer 33, an oxide of metal or semi-metal such as SiO or $SiO_2$, a fluoride such as $MgF_2$ or $NaF \cdot AlF_3$, a sulfide such as ZnS or $Sb_2S_3$, an iodide, an organic high molecular weight substance or the like is suitable for the wavelength of an ordinary reproducing light such as a laser. Also, any substance may be used if it almost transmits the reproducing light therethrough, but substantially, it is desirable that the imaginary number portion of the refractive index be 0.01 or less in the wavelength range of the reproducing light. As the substance of great reflection for the reproducing light forming the reflective and phase modulating layer 33, a substance having a reflection factor of 80% or more in the wavelength range of the reproducing light, such as Cu, Ag, Au or Al, is desirable. The reflective and phase modulating layer 33 formed of such a substance is of a structure in which a metal is dispersed in the dielectric material as previously mentioned and therefore, it is hard to be oxidized and excellent in preservation stability as compared with the conventionaly metallic reflective layer.

Where the reflective and phase modulating layer 33 is formed of a mixture of a substance (MII) of small absorption and a substance (MI) of great reflection as previously described, the composition ratio of these substances differs depending on the wavelength of the reproducing light or the substances used, and usually it is desirable that the substance of great reflection be varied in the range of 20–95 atomic % relative to the whole ($0.20 \leq X \leq 0.95$ when the reflective layer is formed of $M_{Ix}M_{III-x}$). The thickness of the reflective and phase modulating layer 33 differs depending on the substances forming the layer or said composition, and usually 20–10000 Å, and particularly 2000–4000 Å is preferable. Also, it is desirable that the magnetic recording layer 22 when such reflective and phase modulating layer 33 is provided be formed to a thickness of 100–1000 Å so that a sufficient quantity of light is transmitted therethrough. Various methods of forming the reflective and phase modulative layer 33 would occur to mind, but where the reflective and phase modulating layer 33 is to be formed of a mixture of a dielectric material and a metal, a method of evaporating these materials at a time by sputtering, electron beam evaporation, resistance heating evaporation or the like is suitable. The phase difference of said reproducing light reflected by the reflective and phase modulating layer 33 is substantially determined by the distribution of the composition of the mixture forming the reflective and phase modulating layer 33. Such a composition permits control of very high accuracy and therefore, as compared with a case where the thickness of the transparent dielectric material layer is controlled as in the prior art, an opto-magnetic recording medium which readily provides a desired phase difference can be made.

In FIG. 3, the protective layer 34 protects the reflective and phase modulating layer 33 against flaws, dust or the like or entry of moisture or oxygen, but it is not always necessary depending on the materials of the reflective and phase modulating layer 33. The protective layer 34 may be formed by applying an organic high molecular film or may be provided by evaporating an inorganic material such as an oxide (SiO, $SiO_2$ or the like), a nitride ($Si_3N_4$ or the like) or a sulfide or a metal material.

In the opto-magnetic recording medium of the present invention, an auxiliary layer may be provided as required. For example, an anti-reflection layer or an adiabatic layer formed of an organic high molecular material of low heat conductivity may be provided as an auxiliary layer between the light-transmitting substrate 31 and the magnetic recording layer 32 of FIG. 3. Also, in addition to such auxiliary layer, the opto-magnetic recording medium of the present invention may include a layer on which an index mark or a tracking mark is written. Also, a medium capable of accomplishing both-side recording can be realized as by cementing the two opto-magnetic recording mediums of the present invention to each other with their reflective layers as the inside.

The present invention will hereinafter be described specifically with comparative examples and embodiments mentioned.

Sample 1 (Comparative Example)

An opto-magnetic recording medium was made by the following steps of process. A smooth glass substrate having a diameter of 120 mm and a thickness of 1.5 mm was cleaned, and hardening type silicone resin (SR-2410 resin produced by Tore Silicone Co., Ltd.) was dried and applied to a film thickness of 5000 Å onto one surface of the glass substrate by a spinner applicator. The drying conditions were 150° C. and two hours. The silicone resin is for preventing the dissipation of the heat generated by a beam being applied to the magnetic recording layer.

Subsequently silicon monoxide (SiO, purity 99.9%) as an anti-reflection layer was formed to a predetermined thickness in which the reflection factor became the minimum, on the surface of said silicone resin layer by electron beam evaporation. This thickness is of a value obtained by dividing the wavelength 820 nm of the semiconductor laser (GaAsAl) now being used by a value four times the refractive index of silicon monoxide, and is about 1000 Å. Next, an amorphous thin film having a composition of $Fe_{0.76}Gd_{0.12}Tb_{0.12}$ as a magnetic recording layer was formed to a thickness of 200 Å by the use of a sputtering apparatus. Further, silicon monoxide (SiO, purity 99.9%) as a protective layer was formed to a thickness of 3000 Å by electron beam evaporation. Pit recording and reproduction were effected on this opto-magnetic recording medium from the glass surface side thereof by the case of an optical head. The recording optical head was of a construction which used a semiconductor laser (820 nm) of output 20 mW as a light source and applied a minute spot of 1.2 $\mu m \phi$ to the surface of the recording layer. Also, an electromagnet was disposed so that a magnetic field could be applied in a direction perpendicular to the surface of the recording layer. The disc-like opto magnetic recording medium was rotatively driven to uniformly magnetize the recording layer, and then the laser was pulse-oscillated to pit-record a signal of 5 MHZ. The reading-out and reproduction were carried out by using a semiconductor laser of 10 mW as a light source and applying the laser beam to the recording layer as during the recording and detecting the reflected light through a polarizer. The C/N value of the reproducing signal (the S/N value in the central frequency zone of the signal) was 24 dB.

Samples 2–5 (Comparative Examples)

A recording layer comprising $Fe_{0.76}GD_{0.12}Tb_{0.12}$ was formed in the same manner as Sample 1 and a metallic reflective layer as shown in Table 1 below was provided thereon. A protective layer of silicon monoxide having a thickness of 3000 Å was provided on the metallic reflective layer. Recording and reproduction were effected in the same manner as Sample 1 and the C/N values of the reproducing signal as shown in Table 2 below were obtained.

Samples 6–17 (Comparative Examples)

A recording layer comprising $Fe_{0.76}Gd_{0.12}Tb_{0.12}$ was formed in the same manner as Sample 1 and a reflective layer comprising a mixture of uniform composition as shown in Table 1 was provided thereon. A protective layer of silicon monoxide having a thickness of 3000 Å was provided on the reflective layer. Recording and reproduction were effected in the same manner as Sample 1 and the C/N values of the reproducing signal as shown in Table 2 were obtained.

Samples 18–29 (The Present Invention)

An amorphous film of a composition of $Fe_{0.76}Gd_{0.12}Tb_{0.12}$ as a recording layer was formed to a thickness of 200 Å in the same manner as Sample 1, whereafter a substance ($M_I$) of small absorption and a substance ($M_{II}$) of great reflection shown in Table 1 were co-evaporated while the composition ratio thereof was varied by sputtering, whereby a reflective and phase modulating layer was formed. A protective layer of silicon monoxide having a thickness of 3000 Å was provided on the reflective and phase modulating layer. The composition ratios of the interface (A) and the interface (B) in Table 1 show the composition ratios in the interface (A) and the interface (B) shown in FIG. 4. Also, in the reflective and phase modulating layer, film formation was effected so that the composition ratio of the respective elements varied substantially continuously (linearly).

The values of n and k on the interfaces (A) and (B) shown in Table 1 are the anticipated values calculated by Maxwel Garnet's equation. As shown in Table 1, n exhibits various values depending on the dielectric material which provides the base of the reflective and phase modulating layer, but the present invention has an effect irrespective of this n.

The recording-reproducing characteristic (the reproduction C/N value) of the opto-magnetic recording medium thus made was tested. As regards the test conditions, as in the case of Sample 1, the laser output for recording was 7 mW on the surface of the medium, the recording signal was a pulse signal of 50% duty and 5 MHz. the laser output for reproduction was 2 mW on the surface of the medium, and the C/N value was evaluated at a band width 30 KHz. The C/N value is considered to indicate both the magnitude of the recording pit and the magnitude of the magneto-optical effect of the medium.

Corrosion Resistance Test

Measurement of the C/N value and peel-off test were carried out after Samples 1-29 were left in a constant-temperature constant-humidity tank of temperature 45° C. and humidity 95% for two months. The measurement of the C/N value was carried out by the previously described method. The peel-off or break-away test was carried out by sticking a Mylar tape to the surface of the protective layer 34, stripping off the tape and observing the peel-off between the layers.

The result of this test is shown in Table 2. In the comparative examples, the peel-off occurred on the interface between the recording layer and the reflective layer.

TABLE 1

| Example | Substance of great reflection MI | Substance of small absorption MII | Composition ratio on (A) interface $\chi$(MI$\chi$MIII-$\chi$ | Values of n and k on interface (A) n,k | Composition ratio on interface (B) $\chi$ | Values of n and k on interface (B) n,k | Film thickness (Å) |
|---|---|---|---|---|---|---|---|
| 2 (Comp. Ex.) | Cu | | 1.00 | 0.12,5.07 | 1.00 | 0.12,5.07 | 600 |
| 6 (Comp. Ex.) | " | MgF$_2$ | 0.85 | 0.31,5.7 | 0.85 | 0.31,5.7 | 900 |
| 7 (Comp. Ex.) | " | " | 0.50 | 3.37,0.42 | 0.50 | 3.37,0.42 | " |
| 18 (Invention) | " | " | 0.50 | 3.37,0.42 | 0.85 | 0.31,5.7 | " |
| 19 (Invention) | " | " | 0.20 | 1.94,0.01 | 0.85 | 0.31,5.7 | " |
| 8 (Comp. Ex.) | " | ZnS | 0.90 | 0.16,5.5 | 0.90 | 0.16,5.5 | " |
| 9 (Comp. Ex.) | " | " | 0.50 | 6.3,1.1 | 0.50 | 6.3,1.1 | " |
| 20 (Invention) | " | " | 0.50 | 6.3,1.1 | 0.90 | 0.16,5.5 | " |
| 21 (Invention) | " | " | 0.20 | 4.1,0.1 | 0.90 | 0.16,5.5 | " |
| 3 (Comp. Ex.) | Ag | | 1.00 | 0.1,5.85 | 1.00 | 0.1,5.85 | 600 |
| 10 (Comp. Ex.) | " | SiO$_2$ | 0.85 | 0.34,6.0 | 0.85 | 0.34,6.0 | 900 |
| 11 (Comp. Ex.) | " | " | 0.50 | 3.4,0.02 | 0.50 | 3.4,0.02 | " |
| 22 (Invention) | " | " | 0.50 | 3.4,0.02 | 0.90 | 0.34,6.0 | " |
| 23 (Invention) | " | " | 0.20 | 2.3,0.01 | 0.90 | 0.34,6.0 | " |
| 12 (Comp. Ex.) | " | SiO | 0.85 | 0.25,6.5 | 0.85 | 0.25,6.5 | " |
| 13 (Comp. Ex.) | " | " | 0.50 | 3.9,0.04 | 0.50 | 3.9,0.04 | " |
| 24 (Invention) | " | " | 0.50 | 3.9,0.04 | 0.85 | 0.25,6.5 | " |
| 25 (Invention) | " | " | 0.20 | 2.3,0.01 | 0.85 | 0.25,6.5 | " |
| 4 (Comp. Ex.) | Au | | 1.00 | 0.16,4.84 | 1.00 | 0.16,4.84 | 600 |
| 14 (Comp. Ex.) | " | Sb$_2$S$_3$ | 0.80 | 0.23,5.4 | 0.80 | 0.23,5.4 | 900 |
| 15 (Comp. Ex.) | " | " | 0.50 | 0.55,5.0 | 0.50 | 0.55,5.0 | " |
| 26 (Invention) | " | " | 0.50 | 0.55,5.0 | 0.80 | 0.23,5.4 | " |
| 27 (Invention) | " | " | 0.20 | 8.1,2.7 | 0.80 | 0.23,5.4 | " |
| 5 (Comp. Ex.) | Al | | 1.00 | 1.99,7.05 | 1.00 | 1.99,7.05 | 600 |
| 16 (Comp. Ex.) | " | 3NaF.AlF$_3$ | 0.85 | 7.8,5.7 | 0.85 | 7.8,5.7 | 900 |
| 17 (Comp. Ex.) | " | " | 0.50 | 2.9,0.14 | 0.50 | 2.9,0.14 | " |
| 28 (Invention) | " | " | 0.50 | 2.9,0.14 | 0.85 | 7.8,5.7 | " |
| 29 (Invention) | " | " | 0.20 | 1.83,0.03 | 0.85 | 7.8,5.7 | " |

TABLE 2

| Example | Initial value of C/N (dB) | Corrosion resistance test C/N value after test (dB) | Peel-off test |
|---|---|---|---|
| 1 (Comp. Ex.) | 24 | 20 | O |
| 2 (Comp. Ex.) | 36 | 28 | X |
| 3 (Comp. Ex.) | 37 | 30 | X |
| 4 (Comp. Ex.) | 37 | 29 | X |
| 5 (Comp. Ex.) | 28 | 25 | Δ |
| 6 (Comp. Ex.) | 39 | 30 | O |
| 7 (Comp. Ex.) | 31 | 23 | Δ |
| 8 (Comp. Ex.) | 38 | 30 | O |
| 9 (Comp. Ex.) | 30 | 22 | Δ |
| 10 (Comp. Ex.) | 38 | 30 | Δ |
| 11 (Comp. Ex.) | 33 | 21 | Δ |
| 12 (Comp. Ex.) | 37 | 30 | Δ |
| 13 (Comp. Ex.) | 31 | 21 | Δ |
| 14 (Comp. Ex.) | 37 | 30 | Δ |
| 15 (Comp. Ex.) | 35 | 23 | X |
| 16 (Comp. Ex.) | 37 | 31 | O |
| 17 (Comp. Ex.) | 24 | 20 | O |
| 18 (Invention) | 38 | 30 | O |
| 19 (Invention) | 36 | 30 | O |
| 20 (Invention) | 38 | 30 | O |
| 21 (Invention) | 36 | 30 | O |
| 22 (Invention) | 38 | 35 | O |
| 23 (Invention) | 37 | 35 | O |
| 24 (Invention) | 37 | 33 | O |
| 25 (Invention) | 35 | 33 | O |
| 26 (Invention) | 37 | 32 | O |
| 27 (Invention) | 37 | 32 | O |
| 28 (Invention) | 37 | 33 | O |
| 29 (Invention) | 36 | 33 | O |

We claim:

1. An opto-magnetic recording medium comprising: a recording layer formed of a magnetic film having a readily magnetizable axis in a direction perpendicular to the surface of the film; and a reflective and phase modulating layer provided in contact with said recording layer, said reflective and phase modulating layer being a single layer and formed so that the imaginary number portion (k) of the refractive index gradually increases in the direction of thickness away from that side which is in contact with said recording layer.

2. An opto-magnetic recording medium according to claim 1, wherein the thickness of said reflective and phase modulating layer is in the range of 20-10,000 Å.

3. An opto-magnetic recording medium according to claim 1, wherein said recording layer comprises a thin film of an amorphous alloy of rare earth-transition metal.

4. An opto-magnetic recording medium according to claim 1, wherein the thickness of said recording layer is in the range of 100-1000 Å.

5. An opto-magnetic recording medium according to claim 1, wherein said reflective and phase modulating layer comprises a mixture of a substantce having a small absorption for the wavelength of light used to reproduce information from the recording medium and a substance having a great reflection for said wavelength of light, and is formed so that the content of the substance of great reflection relative to the whole gradually increases in the direction of thickness of the layer away from the side which is in contact with said recording layer.

6. An opto-magnetic recording medium according to claim 5, wherein said substance having a small absorption comprises a dielectric material selected from the group consisting of oxides of metal, oxides of semi-metal, fluorides, sulfides, iodides and organic high molecular weight material.

7. An opto-magnetic recording medium according to claim 5, wherein said substance having a great reflection comprises a metal.

8. An opto-magnetic recording medium according to claim 5, wherein reflective and phase modulating layer is formed by a vapor deposition of the substance having a small absorption and the substance having a great reflection.

9. An opto-magnetic recording medium according to claim 1, comprising said recording layer and said reflective and phase modulating layer formed in succession on a light-transmitting substrate.

10. An opto-magnetic recording medium according to claim 9, wherein a protective layer is provided on that side of said reflective and phase modulating layer which is opposite to the light-transmitting substrate.

11. An opto-magnetic recording medium according to claim 9, wherein an adiabatic layer is provided between said light-transmitting substrate and said recording layer.

12. An opto-magnetic recording medium according to claim 9, wherein an anti-reflection film is provided between said light-transmitting substrate and said recording layer.

* * * * *

UNITED STATES PATENT AND TRADEMARK OFFICE
CERTIFICATE OF CORRECTION

PATENT NO. : 4,664,977
DATED : May 12, 1987
INVENTOR(S) : YOICHI OSATO, ET AL.

It is certified that error appears in the above-identified patent and that said Letters Patent is hereby corrected as shown below:

COLUMN 8

Line 66, "substantce" should read --substance--.

COLUMN 9

Line 17, "wherein reflective" should read --wherein said reflective--.

Signed and Sealed this

Eighth Day of September, 1987

Attest:

DONALD J. QUIGG

Attesting Officer     Commissioner of Patents and Trademarks